United States Patent
Burini et al.

(10) Patent No.: US 9,384,521 B2
(45) Date of Patent: Jul. 5, 2016

(54) METHOD AND DEVICE FOR ASSESSING THE PRESENCE OF A WATERMARK IN A VIDEO

(71) Applicant: THOMSON LICENSING, Issy de Moulineaux (FR)

(72) Inventors: Cesar Burini, Evreux (FR); Gwenael Doerr, Rennes (FR); Severine Baudry, Rennes (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 20 days.

(21) Appl. No.: 14/324,161

(22) Filed: Jul. 5, 2014

(65) Prior Publication Data

US 2015/0010201 A1 Jan. 8, 2015

(30) Foreign Application Priority Data

Jul. 5, 2013 (EP) .................... 13305961

(51) Int. Cl.
  *G06K 9/00* (2006.01)
  *G06T 1/00* (2006.01)
  *H04N 13/00* (2006.01)

(52) U.S. Cl.
  CPC .............. *G06T 1/0021* (2013.01); *G06T 1/005* (2013.01); *H04N 13/0007* (2013.01); *G06T 2201/0051* (2013.01); *G06T 2201/0065* (2013.01); *G06T 2201/0083* (2013.01)

(58) Field of Classification Search
  None
  See application file for complete search history.

(56) References Cited

U.S. PATENT DOCUMENTS

| | | | |
|---|---|---|---|
| 2004/0250079 A1* | 12/2004 | Kalker | G06T 1/0064 713/176 |
| 2011/0311128 A1 | 12/2011 | Wilkinson et al. | |
| 2012/0063634 A1 | 3/2012 | Doerr et al. | |
| 2012/0163583 A1* | 6/2012 | Nakagata | G10L 19/018 380/28 |

FOREIGN PATENT DOCUMENTS

| | | |
|---|---|---|
| EP | 2426636 | 3/2012 |
| WO | WO2008041061 | 4/2008 |

OTHER PUBLICATIONS

Langelaar, Gerhard C., Iwan Setyawan, and Reginald L. Lagendijk. "Watermarking digital image and video data. A state-of-the-art overview." IEEE Signal Processing Magazine, 17 (5) (2000).*

(Continued)

*Primary Examiner* — Bhavesh Mehta
*Assistant Examiner* — Narek Zohrabyan
(74) *Attorney, Agent, or Firm* — Tutunjian & Bitetto, P.C.

(57) ABSTRACT

The invention relates to a method for assessing the presence of a watermark in a video wherein the video comprises at least a sequence of frames. The method comprises for at least one frame among one of the sequences of frames the steps of computing a set of axial cross-correlation values, wherein each axial cross-correlation value corresponds to a correlation between the frame and a reference watermark shifted along a spatial horizontal axis; obtaining a detection score by computing a weighted sum of values output by a function applied to said axial cross-correlation values; assessing the presence of a watermark according to the detection score. Such method is particularly well adapted to the detection of disparity coherent watermark but is compliant with any watermarking technique. A device implementing the method is further disclosed.

19 Claims, 3 Drawing Sheets

(56) References Cited

OTHER PUBLICATIONS

Kalker et al: "Video watermarking system for broadcast monitoring", Proceedings of SPIE, vol. 3657, Apr. 9, 1999, pp. 103-112.

Hartung et al: "Watermarking of uncompressed and compressed video", Signal Processing, Elsevier Science Publishers B. V. Amsterdam, NL, vol. 66, n° 3, May 28, 1998, pp. 283-301.

Linnartz et al On the design of a Watermarking system Considerations and Rationales, Jan. 1, 2000, Information Hiding Lecture Notes in Computer science, LNCS, Springer, Berlin, DE, pp. 253-269.

Franco-Contreras et al Virtual view invariant domain for 3D video blind watermarking, Image Processing (ICIP), 2011 18th IEEE International Conference ON, IEEE, Sep. 11, 2011, pp. 2761-2764.

Koz et al: "Watermarking of Free-view video", IEEE Transactions on Image Processing, vol. 19, pp. 1785-1797, Jul. 2010.

Halici etal: "Watermarking for Depth-Image-based rendering", IEEE Int'l Conference on Image Processing, pp. 4217-4220, Nov. 2009.

Cox etal: "Secure spread spectrum watermarking for Multimedia", IEEE Transactions on Image Processing, vol. 6, No. 12, Dec. 1997.

Search Report Dated Oct. 31, 2013.

Kumar et al., "Real Coded Genetic Algorithm based Stereo Image Watermarking", International Journal of Secure Digital Information Age, vol. 1, No. 1, Jun. 2009, pp. 23-33.

Lee et al., "Stereoscopic watermarking by horizontal noise mean shifting", Proceedings of SPIE vol. 8303, Media Watermarking, Security, and Forensics 2012, pp. 1-10.

\* cited by examiner

METHOD AND DEVICE FOR ASSESSING THE PRESENCE OF A WATERMARK IN A VIDEO

This application claims the benefit, under 35 U.S.C. §119 of European Patent Application No. 13305961.8, filed Jul. 5, 2013.

FIELD OF THE INVENTION

The invention relates to the detection of watermarks in video, in particular in synthesized view video or tri-dimensional stereo video. More particularly, the invention relates to a method for assessing the presence of a watermark in video and to an associated device implementing the method.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In tri-dimensional (3D) stereo video, both a right and a left view are displayed so that the user enjoys 3D effect. Left and right views are either obtained from a stereo camera capture or left and right view are synthesized from a reference view. In multi-view television, several views of the same scene, captured with different cameras are transmitted to a user. The user is free to display any of the transmitted views of the scene, or even to synthesize an intermediate view from transmitted views, which corresponds to the viewpoint of a virtual camera.

As for standard video, copyright protection remains a concern in 3D or multi-view video. Among many alternative copyrights managements systems, watermarking techniques embed imperceptible information hidden in images. This information is used in forensics to identify the source of an illegal copy. However watermark embedding and watermark detection in 3D video are more complicated than in mono view video. Indeed stereo watermarking essentially raises two technical challenges. Firstly the ability of the detector to detect embedded watermark within new types of pirate samples (e.g. single view, combined view, synthetic view) and secondly the imperceptibility of the embedded watermark with respect to depth perception.

Today, there are mainly two categories of stereo video watermarking systems adapted to 3D stereo or multi-view content.

A first category relates to depth-invariant embedding domain. When the two views of stereo video have been rectified (in the case where cameras are not parallel), pixels only shift along horizontal lines between the two views. To be oblivious to such displacements, a strategy consists in defining a domain invariant to horizontal shifts (for instance the average pixel values along rows) and to embed the watermark in this domain. Such a method is disclosed in a European patent application EP 2 426 636 A1 filed on Aug. 31, 2011 by the same applicant. The representation of the views in this invariant domain is rather stable and well-established watermarking know-how can be readily reused. This being said, the inverse mapping from the invariant domain back to a view is known to introduce possibly annoying artifacts (persistent patterns, headache, etc.).

A second category relates to disparity-coherent watermarking. It consists in exporting a reference watermark in the left and right views, based on their associated disparity information. It is somewhat equivalent to simulating a watermarked 3D scene that would be filmed. This strategy visually yields a rather natural effect: the watermark noise texture is onto the surface of the objects in the scene. On the other hand, watermark detection techniques proposed so far are non-blind. The detector requires side information (the intrinsic/extrinsic parameters of the original cameras, the intrinsic/extrinsic parameters of the synthetic camera) to retrieve the watermark. Some of these parameters may be estimated in practice but detection performances are then heavily tied to the quality of the estimation.

For instance, in "Watermarking of free-view video" (in "IEEE Transactions on Image Processing" volume 19, pages 1785-1797, July 2010), A. Koz, C. Cigla and A. Alatan disclose a method for embedding a watermark into multi views by exploiting the spatial masking properties of the human visual system. They also disclose a method for detecting watermark by exploiting the position and the rotation of a virtual camera. However the method for watermark detection requires at least one of the original views and the parameters of cameras, which are not always available. In case of unknown cameras parameters, they disclose to use the original views, along with corresponding depth-map information, to estimate the camera position and orientation of the synthesized view. The method comprises a step of transforming the original video with respect to the estimated parameters, and a step of subtracting it to the synthesized view. The correlation between the resulting signal and the watermark signal provides better performance in the watermark detection. However the estimation of the cameras parameters requires heavy processing. Such watermark detection is not blind and is complex and time consuming. Besides, the detection performances are sensitive to the cameras parameters estimation.

For instance, in "Watermarking for depth-image-based rendering" (in IEEE International Conference on Image Processing, pages 4217-4220, November 2009), E. Halici and A. Alatan also disclose a method for embedding a watermark into multi views by watermarking a reference view with a reference watermark, and embedding a projection of this reference watermark according to depth data into the other views. The method is somehow equivalent to watermarking the 3D scene shot. They also disclose a method for detecting watermark by estimating the projection matrix between the reference view and the tested view. Since it requires the reference view for watermark detection, the detector is non-blind. Once the projection matrix is estimated, the projection of the reference watermark pattern is computed. Then if the correlation between the tested view and the projected watermark pattern is high enough, the tested view is considered as generated from watermarked views. However, estimating the projection matrix is error prone and time consuming.

A large portion of watermarking systems relies on correlation-based detection. Essentially, the detector computes a correlation score between the content (e.g. a view) and a reference watermark signal. If the content contains the watermark and is aligned with it, the detection score is high and the watermark detected.

In a state of the art watermark detection method applied to video, image, or audio, (as described for instance in "Secure spread spectrum watermarking for multimedia", IEEE trans. On Image processing, vol 6, no 12 December 1997, I. Cox, J. Killian, F. Thomson Leighton, T. Shamoon), the watermark is detected on a content by computing the correlation between the reference watermark signal and the content. Then, the absolute value of the correlation is compared to a threshold, to decide whether the content is watermarked or not with the said watermark signal. If the absolute value exceeds the threshold, then the sign of the correlation enables to determine whether bit '0' or bit '1' has been embedded into the content. Such a method fails to recover the watermark when the content has undergone geometric distortions, for instance if the content has been cropped, or the pixels of the content shifted. If the method is directly applied to stereo image watermarking, view synthesis will cause some pixels to shift, and the amount of shift will depend on the depth information of the corresponding objects in the picture. Thus, computing the correlation between the reference watermark signal and a synthetic view will yield a very low correlation value: only the pixels which have not been shifted by the view synthesis process will contribute positively to the correlation. This state-of-the-art method hence gives very poor detection results for 3D stereo content.

Since, it is usually more convenient to work with blind watermark detectors, a detection algorithm that could be used with any legacy watermark embedder, in particular with disparity-coherent watermark embedder, and that would not require any information related to the original video is therefore is needed.

SUMMARY OF THE INVENTION

The purpose of the invention is to overcome at least one of the disadvantages of prior art by proposing a method for detecting a watermark in a video. The idea of the invention is to compute several correlation values, each corresponding to a shifted version of the watermark signal, and to aggregate these several correlation values to obtain a single detection value. Indeed, instead of reshaping the reference watermark prior to correlation-based detection, we propose a blind detection strategy which collects the different pieces of scattered watermark signal.

To this end, the invention relates to a method for assessing the presence of a watermark in a video wherein the video comprises at least a sequence of frames. The method comprises for at least one frame among one of the sequences of frames the computing of a set of axial cross-correlation values, wherein each axial cross-correlation value corresponds to a correlation between the frame and a reference watermark shifted along a spatial horizontal axis; obtaining of a detection score by computing a weighted sum of values output by a function applied to said axial cross-correlation values assessing the presence of a watermark according to the detection score. Such method is particularly well adapted to the detection of disparity coherent watermark but is compliant with any watermarking technique.

In a first preferred embodiment, the method comprises a preliminary processing of the frame among which whitening the frame and/or clipping. Such preprocessing advantageously improves the detection by reducing the interference of the host signal in the frame onto which will be applied the watermark detection procedure.

According to a particularly advantageous characteristic of the invention, each axial cross-correlation value is computed for a shift within a range.

In a variant the function is, for instance, the absolute value function. In another variant the function output the axial cross-correlation value in case where axial cross-correlation values which is higher than a second threshold and the function output a zero in case where axial cross-correlation values which is lower than a second threshold.

In other embodiments, the video comprises two sequences of frames corresponding to a left view and a right view or the video comprises a sequence of synthesized frames derived from a left and a right view. Advantageously in theses embodiments, the axis is a horizontal axis.

In a second aspect, the invention is directed to a computer-readable storage medium storing program instructions computer-executable to perform the disclosed method.

In a third aspect, the invention is directed to a device comprising at least one processor adapted to compute a set of axial cross-correlation values for at least one frame among one of the sequences of frames, wherein each axial cross-correlation value corresponds to a correlation between the frame and a reference watermark shifted along a determined axis; to aggregate at least one of the axial cross-correlation values to get a detection score; and to compare the detection score to a first threshold to assess the presence of the reference watermark.

While not explicitly described, the present embodiments may be employed in any combination or sub-combination. For example, aggregating features may be combined with pre-processing feature and/or video of type 3D stereo or synthesized view. Besides, any characteristic or variant described for the method is compatible with a device intended to process the disclosed methods and with a computer-readable storage medium storing program instructions.

BRIEF DESCRIPTION OF THE DRAWINGS

Other characteristics and advantages of the invention will appear through the description of a non-limiting embodiment of the invention, which will be illustrated, with the help of the enclosed drawings.

DETAILED DESCRIPTION OF PREFERRED EMBODIMENTS

Since the disclosed detecting method is particularly well adapted to the detection of disparity coherent watermark in 3D stereo video, although compliant with any watermarking technique, a preferred embodiment is described for such watermark scheme and type of video.

Figure 1:
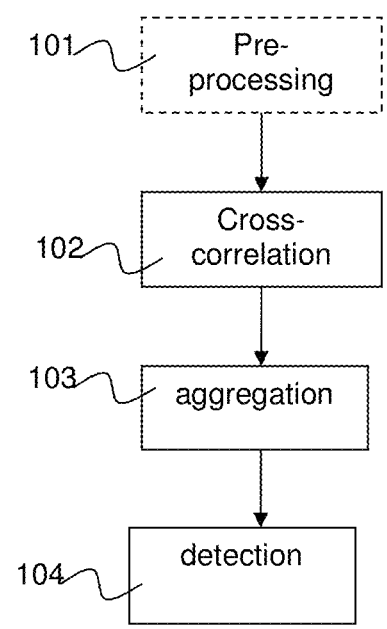
FIG. 1 represents the method for detecting a watermark in a video according to a particular embodiment.

FIG. 1 represents the method for detecting a disparity coherent watermark according to a particular embodiment. The method is applied on a frame among the frames of one of the sequences of frames belonging to the video. In the following description, the term "sequence" comprises a temporal set of frames representative of a video content. Moreover, in practice, the term "sequence" refers to a "view" (either left or right) in a 3D stereo video or to a "view" in a multi views video.

In a first optional step 101, a pre-processing operation is applied to the frame to improve the detection. In a preferred embodiment, such a step consists in applying a filter to the frames. For instance, if the reference watermark is white or high-pass, a whitening filter may be applied to the frames. Depending on the type of filter chosen (e.g. high-pass filter), it is possible to keep only what is of interest in the frame (e.g. high frequencies). By doing so, the interferences between the frame and the watermark in the next steps will be reduced, and the detection results enhanced. Let us consider that the watermark we are looking for is a Gaussian noise centred to zero. In a first variant, the convolution between the frame and a high pass filter is computed. A simple high pass filter is for instance the 3×3 matrix:

$$\frac{1}{9}\begin{bmatrix} -1 & -1 & -1 \\ -1 & 8 & -1 \\ -1 & -1 & -1 \end{bmatrix},$$

Since a frame is mainly composed of low frequency components, high pass filtering will attenuate these components and thus increase the watermark signal to noise ratio. The filtered frame can be kept as it is, or outlier pixel values can be clipped: all pixel values higher/lower than a pre-defined threshold are set to the threshold value.

In a second variant, a Fourier transform is applied to the frame. The filtered frame will be the inverse Fourier transform of the phase (magnitude of the signal set to one) of the Fourier transform of the frame:

$$F' = FFT^{-1}[\text{phase}(FFT[F])]$$

In a second step 102, a set of axial cross-correlation values is computed. Each axial cross-correlation value corresponds to a correlation between the frame and a reference watermark shifted along a determined axis. In an advantageous variant, the axis is a horizontal axis. This variant is well adapted to the case where the video correspond to a stereoscopic content comprising synthesized left and right views or to a sequence of synthetic frames derived from left and right views, where the views are rectified stereo views. Those synthetic views are also called virtual views. In order to detect the watermark using correlation, the frame must not only contain the reference watermark, but also be "aligned" with it, i.e. the pixels of the frame must not have been shifted or cropped prior to computing the correlation value. In the case of a view protected with a disparity-coherent watermark, or a virtual view generated from a watermarked reference view or from a watermarked left and right views, the watermark will be shifted in some areas (the translation being proportional to the depth of the object corresponding to the pixel in the scene) as represented on FIG. 2. Every area of the frame at a given depth will undergo the same shift, and the underlying watermark in these areas will also undergo this shift. The shift between the location of the same object in the left and right view is also called disparity. The state of the art detection method described before, based on a single correlation, will only capture the watermark in the pixel areas where the disparity is null. The step 102 comprises computing the correlation between the frame and the reference watermark shifted for every shift possible, in others words a cross-correlation within a sliding window is computed. The more there are pixels at a given depth, the higher the correlation score between the frame and the shifted watermark will be. The result of this cross-correlation step 102 is a vector ρ, each of its components being the correlation between the frame F (of size h×w) and the watermark W with a given shift l. In the previously described variant wherein the content is a rectified stereoscopic frame, the correlation is performed only for horizontal shifts:

$$\rho(l) = \frac{1}{h,w} \sum_{\substack{1 \leq x \leq w \\ 1 \leq y \leq h}} F(x,y)W(x-l,y)$$

According to a particular characteristic, it is possible to limit the values for the shifts to a certain range. Indeed, because of visual comfort, in a stereoscopic content, disparity values are limited within a range. Indeed, if the disparity is larger or lower to a given range, it could be either impossible for the user to enjoy the 3D object, or it could demand too much efforts for the eyes to converge or diverge. Thus, to lower the computation burden at detection and to avoid considering noisy correlation components, the correlation may be computed only for shifts l in a given range. In an embodiment, the shift is comprised in the range [−40,60] pixels.

In a third step 103, the axial cross-correlation values are aggregated to obtain a detection score. The vector of correlation values ρ(l) is used to decide whether the image is watermarked or not with the given reference watermark, and if the watermarked bit inserted in the image is '0' or '1'. In the variant where the shift is limited within a given range, the several values ρ(l) for l in the given shift range are aggregated together into a single value. According to various characteristics, aggregating the values of this vector over the shift range in order to obtain a detection score comprises Summing all these values:

$$\text{score}(F) = \sum_l \rho(l)$$

Taking the maximum of these values:

$$\text{score}(F) = \max_l \rho(l)$$

or $$\text{score}(F) = \rho(l^*), \, l^* = \underset{l}{\text{argmax}}|\rho(l)|$$

Summing thresholded values:

$$\text{score}(F) = \sum_l \begin{cases} \rho(l) & \text{if } \rho(l) > T_\rho \\ 0 & \text{otherwise} \end{cases}$$

or $$\text{score}(F) = \sum_l \begin{cases} \rho(l) & \text{if } |\rho(l)| > T_\rho \\ 0 & \text{otherwise} \end{cases}$$

Summing n maximal values, when n is a preset parameter (e.g. n=3):

$$\text{score}(F) = \sum_{i=0}^{n-1} \rho(l_i)$$

with $\rho(l_0) \geq \rho(l_1) \geq \ldots \geq \rho(l_{n-1}) \geq \rho(l_n) \geq \ldots \geq \rho(l_R)$ and R being the number of shifts considered (i.e. the number of shifts in the shift range).

Alternatively, the above aggregation function is applied to the absolute value of ρ(l). For instance, the aggregated value is the sum of absolute values of ρ(l) over the shift range:

$$\text{score}(F) = \sum_l |\rho(l)|$$

Any of the above characteristics described for the aggregating function may be combined with the absolute value $|\rho(l)|$ instead of the signed value $\rho(l)$. Any other function of the correlation vector $\rho(l)$ may be considered as an aggregating function.

Once the detection score is computed, a fourth step 104 a comparison of the detection score with a first threshold, called detection threshold $T_d$, allows to decide whether the frame contains the reference watermark or not. If the score is larger than the threshold, the reference watermark is considered embedded in the frame. If the score is lower than a threshold, the frame is detected as not watermarked with the reference watermark. In a variant wherein the watermark embedder uses the polarity of the watermark reference signal to embed a watermark bit, the result of the comparison allows determining the embedded bit. In other words, the watermark embedder inserts reference watermark W(x,y) to embed watermark bit '0', and reference watermark—W(x,y) to embed watermark bit T. Thus, in this case the sign of the detection score is used to decide whether bit '0' or '1' is embedded:

$\text{score}(F) > T_d$: bit '0'

$\text{score}(F) < -T_d$: bit '1'.

Figure 2:
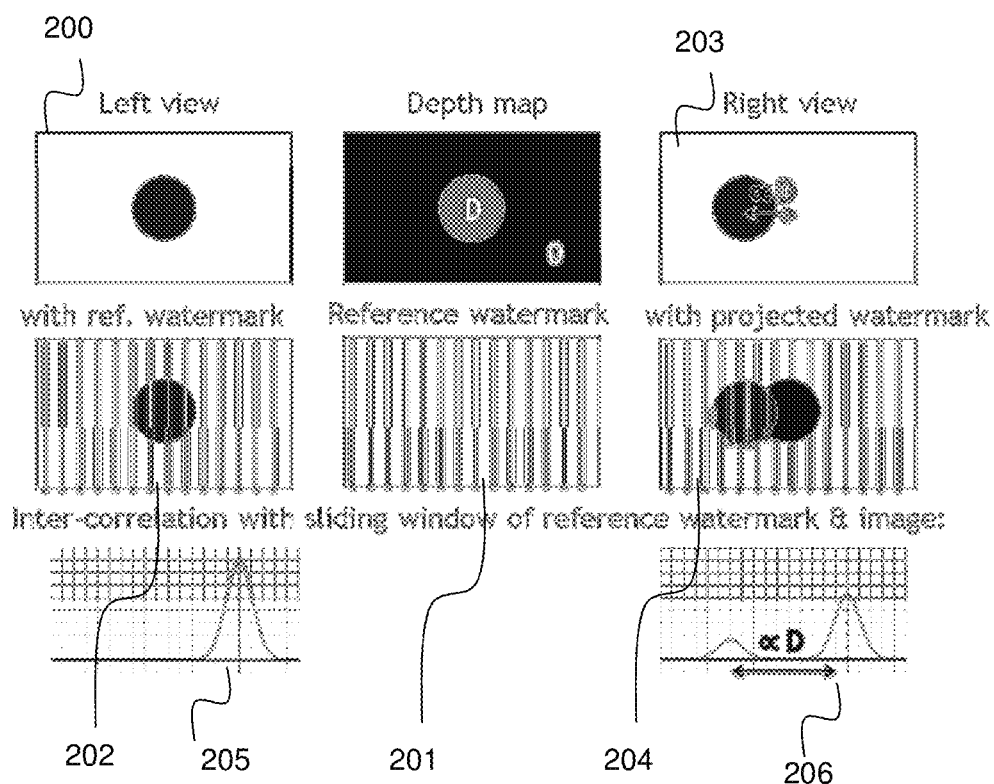
FIG. 2 represents the displacement of pixels in left and right views of the same scene along with the set of cross-correlation values.

FIG. 2 represents the displacement of pixels and thus of the watermark in left and right views of the same scene along with the set of cross-correlation values.

As previously explained, while the regular correlation-based detector will miss all the misaligned pieces of the embedded watermark, the watermark energy associated to each piece could be retrieved by offsetting the reference watermark signal by the corresponding disparity value prior to computing the correlation score.

In practice, it comes down to computing the horizontal cross-correlation between the content and the reference signal. For instance, let us assume that the left view 200 is watermarked with a reference signal 201 resulting in a watermarked left view 202 and that this reference signal 201 is exported in a disparity-coherent fashion onto the right view 203 resulting in a watermarked right view 204. The set of horizontal cross-correlation values reveals a peak 205 centered on 0 in the left view, while it yields a curve 206 similar to the disparity profile in the right view. This cross-correlation and aggregation detection does not require any side information aside the reference watermark. The detection is blind.

Figure 3:
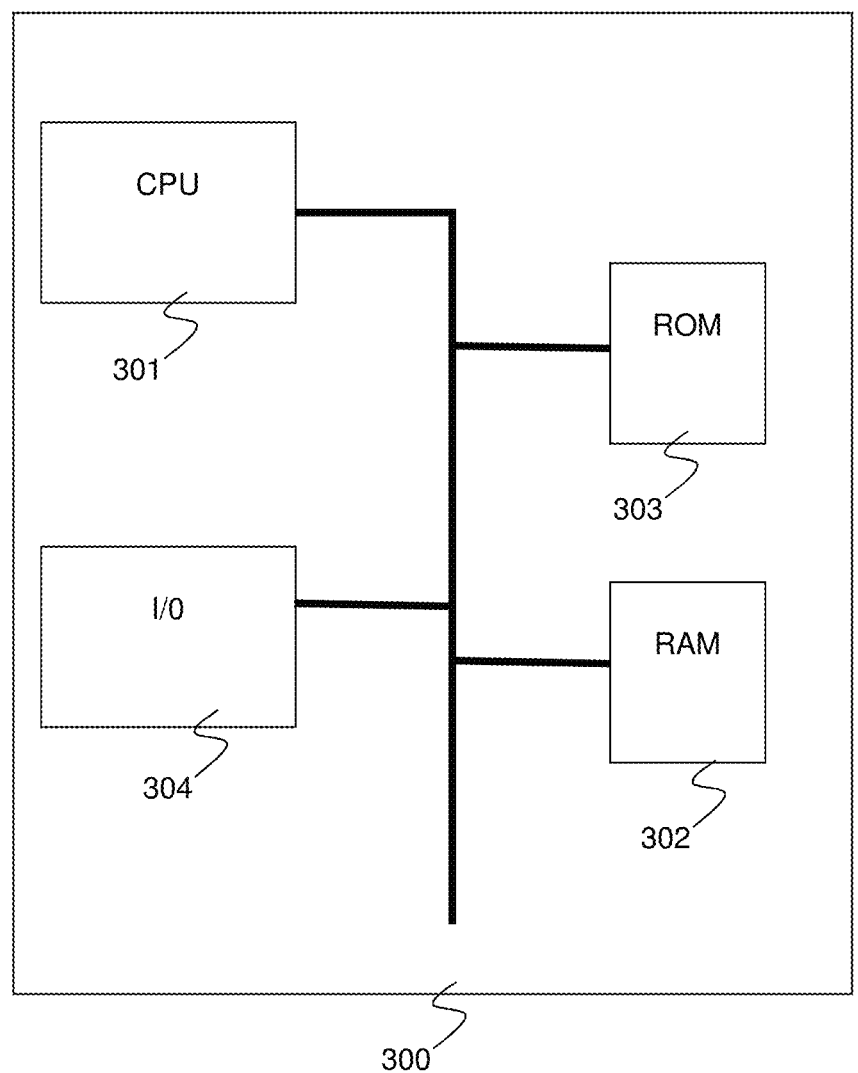
FIG. 3 illustrates a device implementing the method according to a preferred embodiment.

FIG. 3 illustrates a hardware embodiment of a device 300 adapted to implement the steps of the detection method. The skilled person will also appreciate that the method can be implemented quite easily without the need for special equipment by devices such as PCs. The device 300 corresponds for example to a personal computer, to a laptop, to a game console or to any image processing unit. According to different variants, features described for the method are being implemented in software module or in hardware module. The device 300 comprises physical means intended to implement an embodiment of the invention, for instance a processor 301 (CPU), a data memory 302 (RAM or HDD), a program memory 303 (ROM), one of several inputs/outputs 304 (I/O). When powered up, the microprocessor 301 loads and runs the instructions of the watermark detection algorithm comprised in RAM 302. The memory RAM 302 further comprises data representative of the video sequence and associated watermark reference.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system." Furthermore, aspects of the present principles can take the form of a computer readable storage medium. Any combination of one or more computer readable storage medium(s) may be utilized.

Naturally, the invention is not limited to the embodiments and characteristics previously described.

In particular, the invention is compatible with any watermark scheme.

The invention claimed is:

1. A method for assessing the presence of a watermark in a video, wherein said video comprises at least a sequence of frames, the method comprises for at least one frame among one of the sequences of frames:
   computing a set of axial cross-correlation values, each axial cross-correlation value corresponding to a correlation between said frame and a reference watermark shifted along a spatial horizontal axis;
   obtaining a detection score by computing a weighted sum of values output by a function applied to said axial cross-correlation values; and
   assessing the presence of a watermark according to the detection score.

2. The method according to claim 1, further comprising a preliminary processing of said frame, said preliminary processing comprising at least one of whitening said frame, or clipping.

3. The method according to claim 1, wherein each axial cross-correlation value is computed for a shift within a range.

4. The method according to claim 1, wherein said function comprises an identity function.

5. The method according to claim 1, wherein assessing the presence of a watermark according to the detection score further comprises comparing the detection score to a first threshold.

6. The method according to claim 1, wherein the function outputs the axial cross-correlation value in case where axial cross-correlation values which is higher than a clipping threshold and the function outputs a zero in case where axial cross-correlation values which is lower than the clipping threshold.

7. The method according to claim 1, wherein said video comprises two sequences of frames corresponding to a left view and a right view.

8. The method according to claim 1, wherein said video comprises a sequence of synthesized frames derived from a left and a right view.

9. A non-transitory computer-readable storage medium storing program instructions computer-executable to perform the method of claim 1.

10. A device for assessing the presence of a watermark in a video, wherein said video comprises at least a sequence of frames, the device comprising at least one processor adapted to:
   compute a set of axial cross-correlation values for at least one frame among one of the sequences of frames, each axial cross-correlation value corresponding to a correlation between said frame and a reference watermark shifted along a spatial horizontal axis;

obtain a detection score by computing a weighted sum of values output by a function applied to said axial cross-correlation values; and assess the presence of a watermark according to the detection score.

11. The device according to claim 10, wherein the processor is further adapted to preliminarily process said frame by whitening said frame, or clipping.

12. The device according to claim 10, wherein each axial cross-correlation value is computed for a shift within a range.

13. The device according to claim 10, wherein said function comprises an identity function.

14. The device according to claim 10, wherein the assessing of the presence of a watermark according to the detection score further comprises the processor further configured to compare the detection score to a first threshold.

15. The device according to claim 10, wherein the function outputs the axial cross-correlation value in case where axial cross-correlation values which is higher than a clipping threshold and the function outputs a zero in case where axial cross-correlation values which is lower than the clipping threshold.

16. The device according to claim 10, wherein said video comprises two sequences of frames corresponding to a left view and a right view.

17. The method according to claim 10, wherein said video comprises a sequence of synthesized frames derived from a left and a right view.

18. A method for determining the presence of a watermark in a video, wherein said video comprises at least a sequence of frames, the method comprising for at least one frame among one of the sequences of frames:

computing a set of axial cross-correlation values, each axial cross-correlation value corresponding to a correlation between said frame and a reference watermark shifted along a spatial horizontal axis;

obtaining a detection score by computing a weighted sum of values output by a function applied to said axial cross-correlation values; and obtaining the watermark using a polarity value of the detection score.

19. A device for assessing the presence of a watermark in a video, wherein said video comprises at least a sequence of frames, the device comprising at least one processor adapted to:

compute a set of axial cross-correlation values for at least one frame among one of the sequences of frames, each axial cross-correlation value corresponding to a correlation between said frame and a reference watermark shifted along a spatial horizontal axis;

obtain a detection score by computing a weighted sum of values output by a function applied to said axial cross-correlation values; and obtain the watermark according to a polarity value of the detection score.

* * * * *